US006883093B2

(12) United States Patent
McBrearty et al.

(10) Patent No.: US 6,883,093 B2
(45) Date of Patent: Apr. 19, 2005

(54) METHOD AND SYSTEM FOR CREATING AND MANAGING COMMON AND CUSTOM STORAGE DEVICES IN A COMPUTER NETWORK

(75) Inventors: Gerald F. McBrearty, Austin, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 09/726,275

(22) Filed: Nov. 30, 2000

(65) Prior Publication Data

US 2002/0065840 A1 May 30, 2002

(51) Int. Cl.[7] .............................................. G06F 1/24
(52) U.S. Cl. ........................... 713/100; 713/1; 713/2; 707/201; 707/203
(58) Field of Search ............................ 713/1, 2, 100; 707/201, 203

(56) References Cited

U.S. PATENT DOCUMENTS

| | | | | |
|---|---|---|---|---|
| 5,255,387 A | * | 10/1993 | Arnold et al. | 707/201 |
| 5,909,689 A | * | 6/1999 | Van Ryzin | 707/203 |
| 5,999,947 A | * | 12/1999 | Zollinger et al. | 707/203 |
| 6,675,258 B1 | * | 1/2004 | Bramhall et al. | 711/114 |

* cited by examiner

Primary Examiner—Thomas Lee
Assistant Examiner—Vajirachai Komol
(74) Attorney, Agent, or Firm—Mark S. Walker; Edmond A. DeFrank

(57) ABSTRACT

A method and system for creating and managing a plurality of storage devices in a computer network. The present invention creates a common root storage device, which stores files that are shared among several computers in the network, and a custom root storage device, which store files specific to a single computer. The method of the present invention includes creating common and custom root storage devices within the network, recognizing these devices during startup (boot) of a network computer and updating the common root storage devices as needed. In a preferred embodiment, multiple common root storage devices are used so that an alternate common root storage device may be updated while the primary common root storage device is in use. The present invention also includes a system for creating and managing storage devices on computers within the computer network using the aforementioned methods.

15 Claims, 9 Drawing Sheets

METHOD AND SYSTEM FOR CREATING AND MANAGING COMMON AND CUSTOM STORAGE DEVICES IN A COMPUTER NETWORK

BACKGROUND OF THE INVENTION

1. Field of the Invention

The present invention relates in general to computer storage device management and more particularly to a method and system for creating and managing a plurality of storage devices in a computer network.

2. Related Art

Computer networks are widespread and vitally important in many diverse applications including business, universities and government. In general, a computer network is two or more computers (or associated devices) that are connected by communication facilities. A computer network generally includes a server, which is a computer that provides shared resources to users of the network, and a client, which is a computer that accesses the shared network resources provided by the server using the communication facilities. For example, the Internet (via the World Wide Web (WWW)) is a wide-area network (WAN) environment that enables remote clients to request and receive data located on a server.

It is common to have many different types of clients in a computer network due to differing ages and capabilities of client computers and the diversity of user needs. By way of example, a heterogeneous computer network may include client computers having different hard drive sizes, various amounts of processing power, different operating systems and applications installed. Typically, an individual server is specifically configured to meet the needs of similar client computers, so that in a heterogeneous computer network there may be several such servers.

One problem with this type of heterogeneous computer network is that the difference between client computers and corresponding servers can greatly increase the workload of an administrator of the network. More specifically, in order to update the computer network with, for example, a new version of an application each individual server and often each client computer must be updated. This can be a tedious and time-consuming endeavor for the network administrator. Accordingly, what is needed is a method and a system for managing storage devices in a computer network that simplifies the updating of the network such that each server and client computer does not need be updated individually.

SUMMARY OF THE INVENTION

To overcome the limitations in the prior art as described above and other limitations that will become apparent upon reading and understanding the present specification, the present invention includes a method and system for creating and managing a plurality of storage devices in a computer network. The method and system of the present invention use a common root storage device, which stores files common to computer in the network, and a custom root storage device, which stores files specific to an individual computer in the network.

In general, the method of the present invention includes creating common and custom root storage devices within the network, recognizing these devices during startup (boot) of the computer network and updating the common root storage devices as needed. In a preferred embodiment, a plurality of common root storage devices are created. The installation method of the present invention allows an administrator to create common and custom root storage devices and create volume groups for these devices. During booting of the computer network, the boot method takes into account these common and custom root storage devices and volume groups. Moreover, the boot method can force the network to boot from an alternate common root storage device so that updating of the primary common root storage device can occur. An updating method of the present invention updates each of the common root storage devices in succession, and the network boots from the common root storage device that is not being updated. The present invention also includes a system for creating and managing storage devices on the computer network that uses these methods.

The present invention provides several advantages over existing storage device management techniques. Providing common and custom root storage devices simplifies administration of the network because only the common root storage device need to be updated. Moreover, having a plurality of common root storage devices increases network reliability by ensuring that even if one common root storage device is unavailable another may be used. Utilizing a plurality of common root storage devices also ensures that the network will not have to be shutdown during updating, because the network can boot from one of the common root devices while the other common root device is being updated.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

The method and system of the present invention provide common and custom root storage devices for storing files on a computer network. The common root storage device stores files that are shared among several computers in the network, while the custom root storage devices store files for a specific computer. These root storage devices are created by an install method that determines what available storage devices may be used. Upon reboot, the computer network uses the common and custom root storage devices. In a preferred embodiment, multiple common root storage devices are used so that an alternate common root storage device may be updated while the primary common root storage device is in use. After updating of the alternate common root storage device, the computers in the network then boot to the alternate common root storage device while the primary common root storage device is updated.

In the present invention, the common root storage device may be located either on a local computer within the network or on a storage area network (SAN). A storage area network (SAN) is a high-speed system of shared storage devices. These storage devices are capable of storing digital data and provide each server within the network access to each storage device. Because the data is not stored directly on any of the servers within the network, the processing power of each server can be utilized for other tasks, thereby increasing network performance. In a preferred embodiment, the common and custom root storage devices are divided into volume groups (VGs). A volume group is a collection of storage devices that are treated as a single large storage area. Each individual storage device is formatted into a physical volume (PV), and each physical volume has a name and belongs to a volume group. A volume group defines one or more logical volumes (LVs). Logical volumes are groups of information located on physical volumes. Although data on a physical volume can be discontiguous, the data on a logical volume appears to the user as contiguous. This arrangement permits file systems, paging space and other logical volumes to be resized or relocated, span multiple physical volumes and have their contents replicated for greater flexibility and availability in data storage. U.S. Pat. No. 5,799,187 by Gerald McBrearty entitled "System and Method for Creating and Maintaining a CD ROM Client in a Computer Network", describes using a CD-ROM client to populate a local client hard drive.

II. Exemplary Operating Environment

Figure 1:
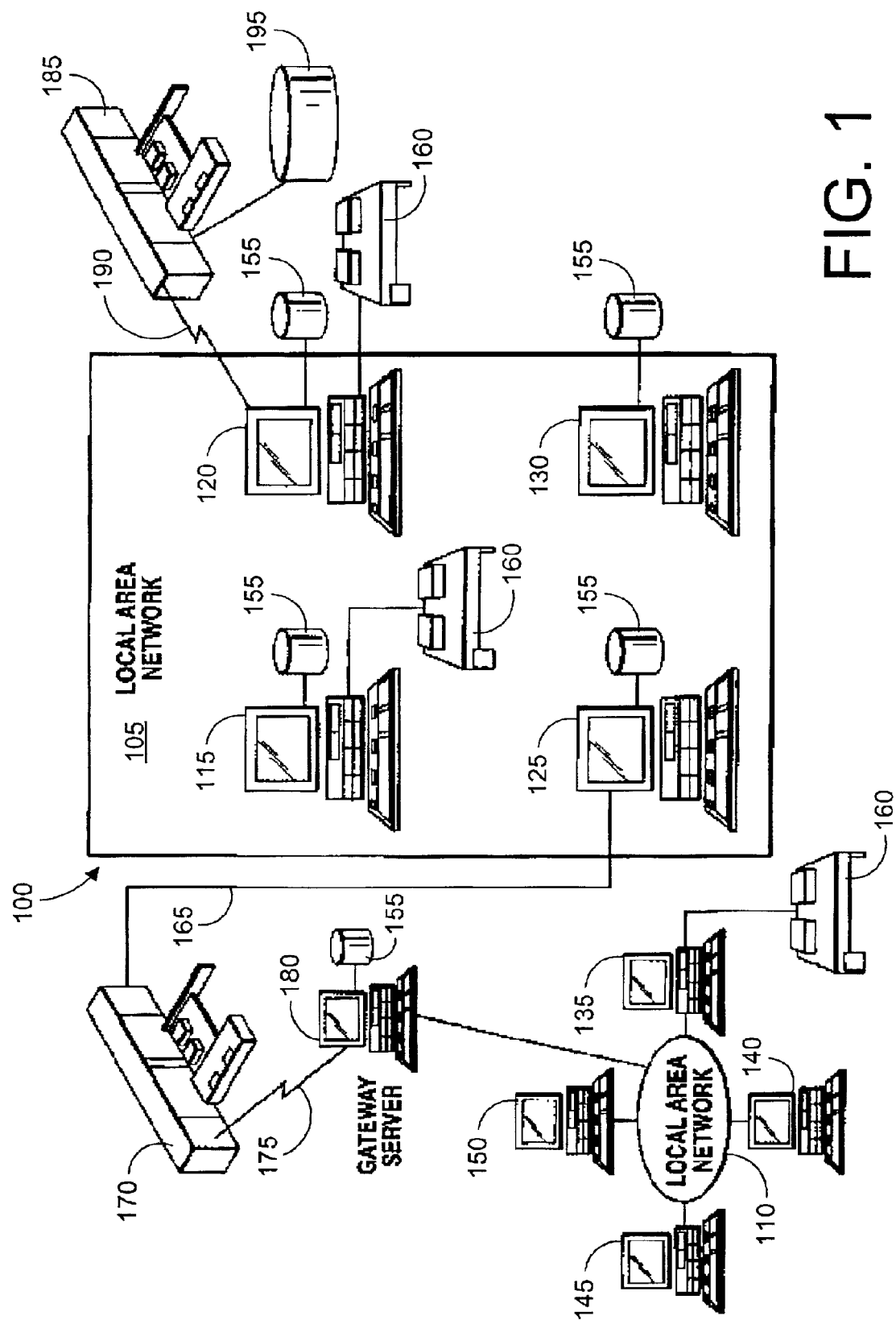
FIG. 1 illustrates a conventional hardware configuration for use with the present invention
Figure 2:
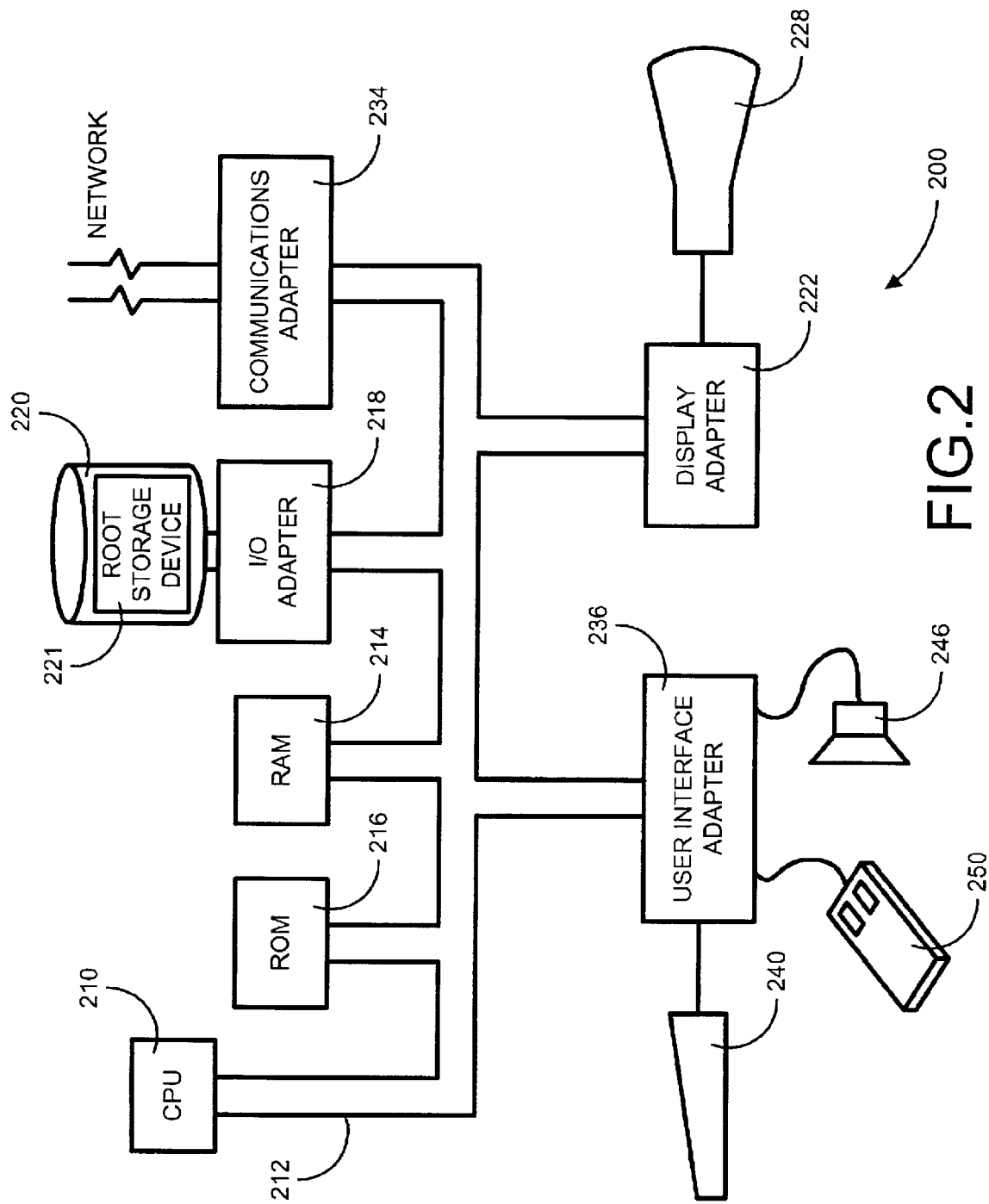
FIG. 2 is a block diagram of a computer used in FIG. 1 incorporating the present invention and is shown for illustrative purposes only.

As shown in FIGS. 1–8 for the purposes of illustration, the invention is embodied in method and system for managing a computer network that includes creating and managing a plurality of volume groups on the network. The following discussion is designed to provide a brief, general description of a suitable environment in which the present invention may be implemented. It should be noted that FIGS. 1 and 2 depict only one of several ways in which the present invention may be implemented. For example, those skilled in the art will appreciate that the invention may be practiced using a variety of computer systems such as, for example, personal computers (PC), server computers, hand-held devices, multiprocessor systems, microprocessor-based or programmable consumer electronics, network PCs, mini-computers and mainframe computers.

FIG. 1 illustrates a conventional hardware configuration for use with the present invention. In particular, a computer system 100 may include one or more networks, such as a local area network (LAN) 105 and 110. Each of the LANs 105, 110 includes a plurality of individual computers 115, 120, 125, 130, 135, 140, 145 and 150. The computers within the LANs 105, 110 may be any suitable computer such as, for example, a personal computer made by International Business Machines (IBM) Corporation, located in Armonk, N.Y. Typically, each of the plurality of individual computers is coupled to a storage device 155 (such as disk drive) that may be used to store data (such as applications) and computer-executable instructions in accordance with the present invention. Each of the plurality of individual computers also may be coupled to an output device 160 (such as a printer) for producing tangible output. The LANs 105, 110 may be coupled via a first communication link 165 to a communication controller 170, and from the communication controller 170 through a second communication link 175 to a gateway server 180. The gateway server 180 is preferably a personal computer that serves to link the LAN 105 to the LAN 110.

The computer system 100 may also include a plurality of mainframe computers, such as a mainframe computer 185, which may be in communication with one or more of the LANs 105, 110 by means of a third communication link 190. The mainframe computer 185 is typically coupled to a storage device 195 that is capable of serving as a remote storage for one or more of the LANs 105, 110. Similar to the LANs 105, 110 discussed above, the storage device may be used to store data and computer-executable instructions in accordance with the present invention. Those skilled in the art will appreciate that the mainframe computer 185, the LAN 105 and the LAN 110 may be physically located a great distance from each other.

FIG. 2 is a block diagram of a computer used in FIG. 1 incorporating the present invention and is shown for illustrative purposes only. A computer 200 includes any suitable central processing unit (CPU) 210, such as a standard microprocessor, and any number of other objects interconnected by a system bus 212. For purposes of illustration, the computer 200 includes memory such as random-access memory (RAM) 214 and read-only memory (ROM) 216 connected to the system bus 212 by an input/output (I/O) adapter 218. The computer 200 also includes storage devices (such as hard disk or disk drives 220) that include a root storage device 221 thereon. As explained in detail below, if the computer 200 is a client computer then the root storage device 221 is a custom root storage device and if the computer 200 is a server computer then the root storage device 221 is a common root storage device.

The computer 200 further includes a display adapter 222 for connecting the system bus 212 to a suitable display device 228. In addition, a user interface adapter 236 is capable of connecting the system bus 212 to other user interface devices, such as a keyboard 240, a speaker 246, a mouse 250 and a touchpad (not shown). In a preferred embodiment, a graphical user interface (GUI) and an operating system (OS) reside within a computer-readable media and contain device drivers that allow one or more users to manipulate object icons and text on the display device 228.

Any suitable computer-readable media may retain the GUI and OS, such as, for example, the RAM 214, ROM 216, hard disk or disk drives 220 (such as magnetic diskette, magnetic tape, CD-ROM, optical disk or other suitable storage media).

Figure 3A:
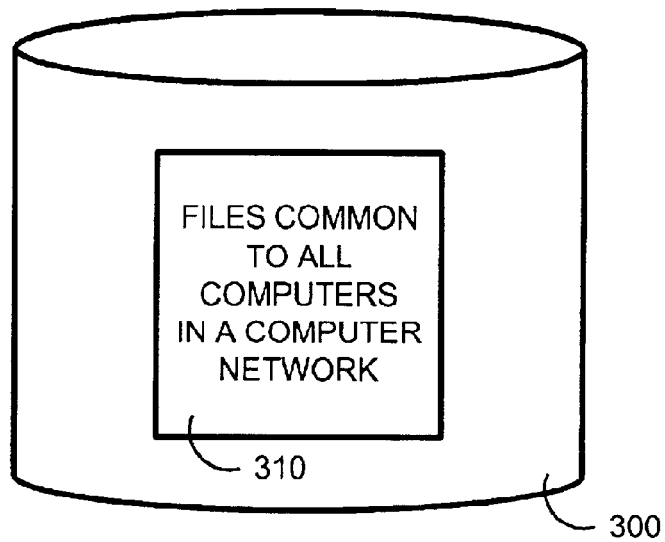
FIG. 3A is a general block diagram of a common root storage device of the present invention.
Figure 3B:
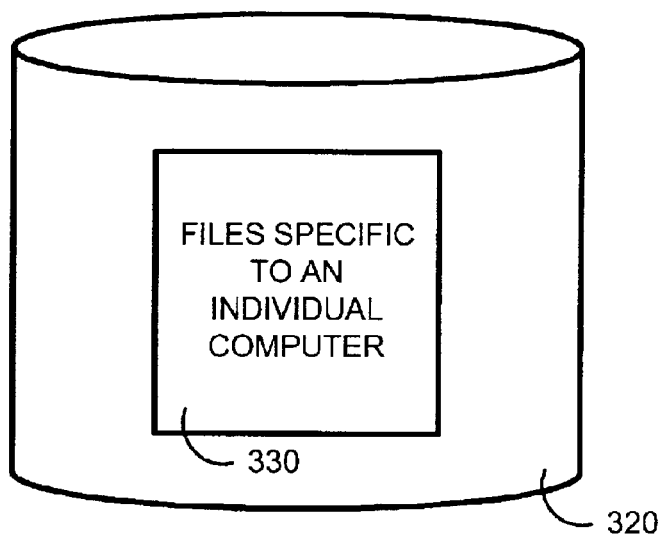
FIG. 3B is a general block diagram of a custom root storage device of the present invention.

FIG. 3A is a general block diagram of a common root storage device of the present invention, and FIG. 3B is a general block diagram of a custom root storage device of the present invention. In particular, as shown in FIGS. 3A and 3B and according to the present invention, a common root storage device 300 generally is accessible by a server computer within a computer network and includes files that are common to all computers (such as /usr files) in the computer network (box 310). Moreover, a custom root storage device 320 generally is accessible by a client computer in the computer network and includes files that are specific (such as /tmp files) to the individual computer (box 330).

III. General Operation

In general, the method and system of the present invention create and manage a plurality of storage devices such that files common to computers in the network are kept in a location that is accessible by each network computer. In particular, a common root storage device is created for storing common files, while a custom root storage device is created to store files specific to an individual computer. Managing of the common and custom root storage devices includes recognizing the devices upon boot of the computer network and updating the common devices as needed.

Figure 4:
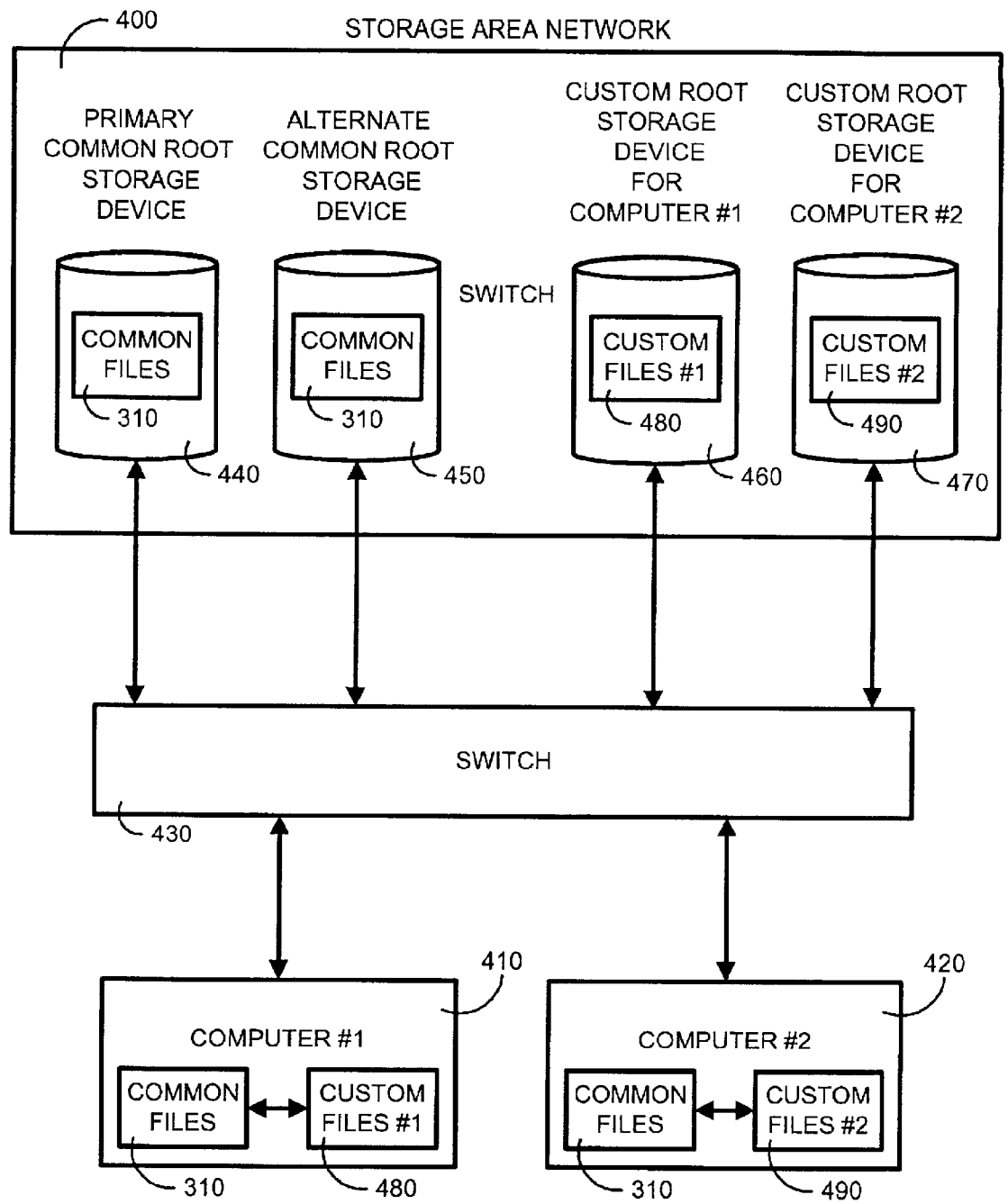
FIG. 4 is a general block diagram illustrating a preferred embodiment of the operation and interaction of the present invention.

FIG. 4 is a general block diagram illustrating a preferred embodiment of the operation and interaction of the present invention. In particular, a storage area network 400 is in communication with computer #1 410 and computer #2 420 through a switch 430. The storage area network 400 communicates with computer #1 410 and computer #2 420 using at least one disk protocol. In this regard, the present invention is different from a "diskless" workstation because the disk protocols are used to communicate with each storage device in the storage area network 400.

The storage area network 400 includes a primary common root storage device 440 and an alternate common root storage device 450. Although in the preferred embodiment shown in FIG. 4 the storage area network 400 is includes the common root storage devices, alternatively the common root storage devices may not be on the storage area network 400 but may be a storage device on a local computer. As explained in detail below, the alternate common root storage device 450 is used in situations where the primary common root storage device 440 is not available. Both the primary common root storage device 440 and the alternate common root storage device 450 include common files 310 that are common to both computer #1 410 and computer #2 420. Moreover, the storage area network 400 includes a custom root storage device 460 for computer #1 410 and a custom root storage device 470 for computer #2 470.

Custom root storage device 460 includes custom files #1 480 specific to computer #1 410 and custom root storage device 470 includes custom files #2 490 that are specific to computer #2 420. Although the common files 310 and the custom files 480, 490 are stored in different physical locations, both computers 480, 490 have access to the common files 310 and computer #1 410 has access to custom file #1 480 and computer #2 420 has access to custom files #2 490.

Figure 5:
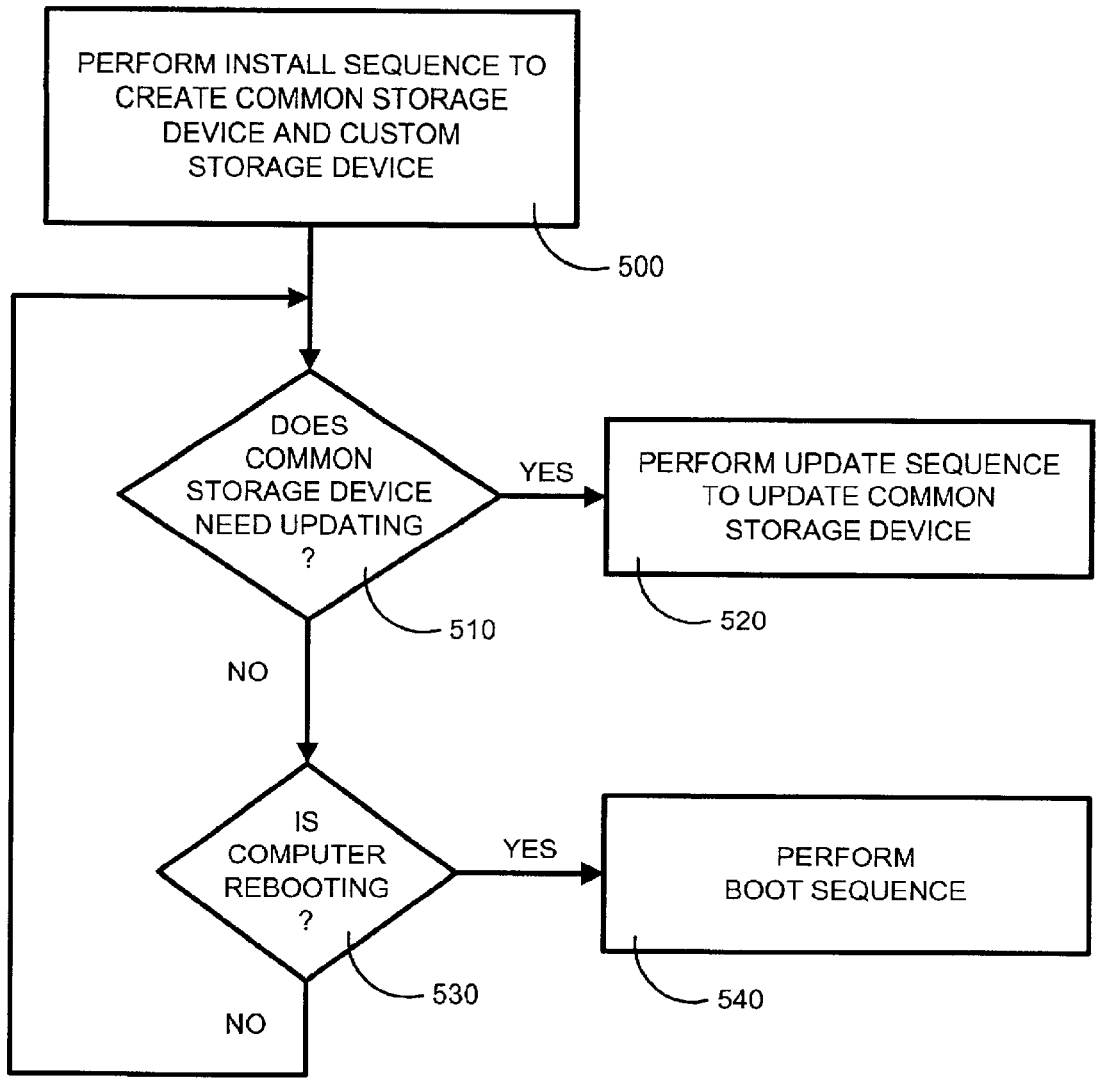
FIG. 5 is a flow diagram illustrating the general operation of the present invention.

FIG. 5 is a flow diagram illustrating the general operation of the present invention. Specifically, the present invention is installed on a computer network by performing an install sequence to create a common storage device and a custom storage device (box 500). Once the install sequence is finished the present invention is installed on the computer network. The present invention determines whether the common storage device needs updating (box 510). If updating is needed, an update sequence is performed to update the common storage device (box 520). If a computer on the network is shutdown and restarted, the present invention determines that the computer is rebooting (box 530). After rebooting has occurred, a boot sequence is performed (box 540) to enable the root storage devices and ensure the present invention is operating properly.

IV. Operational Details

Figure 6:
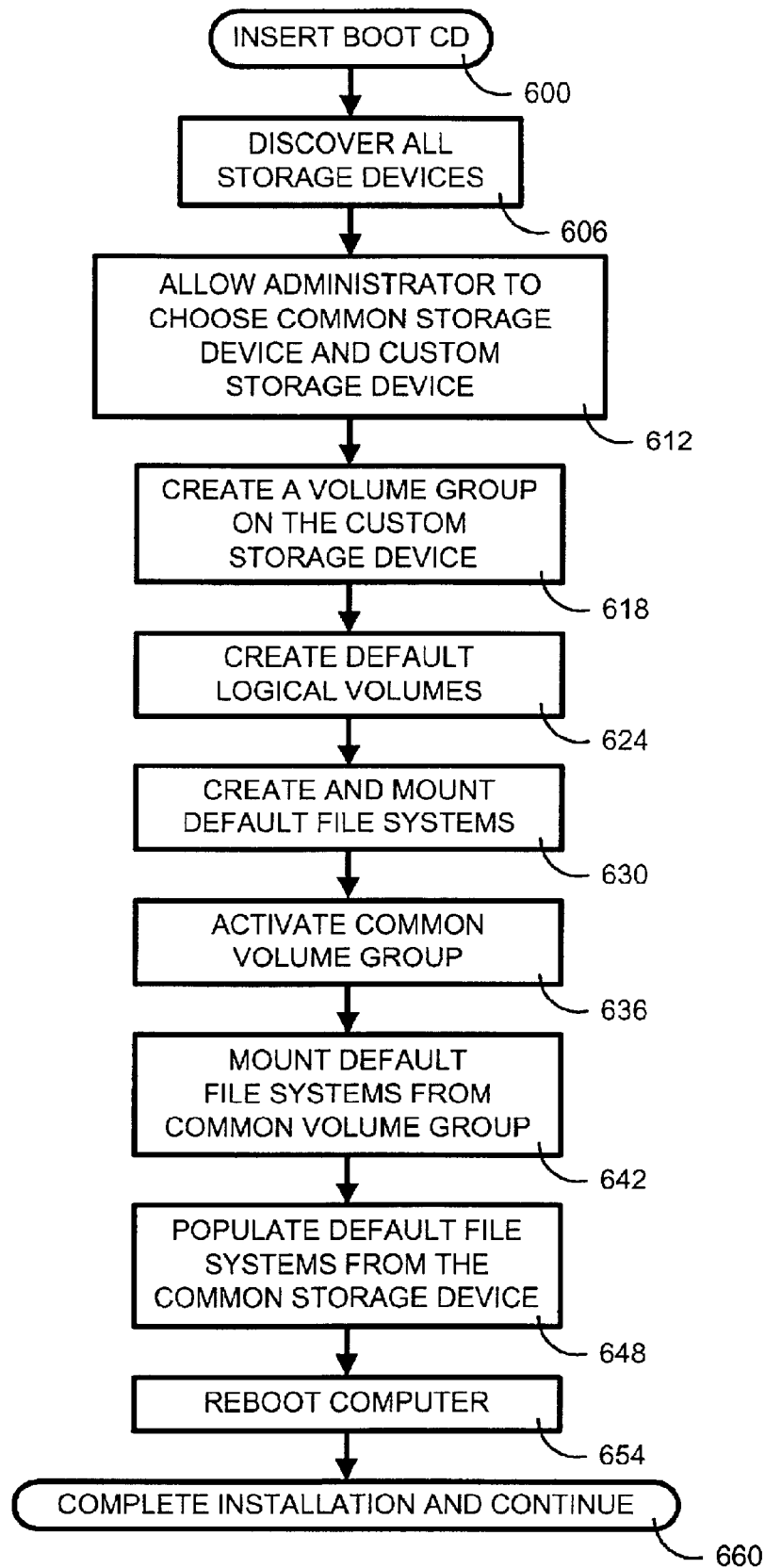
FIG. 6 is a detailed flow diagram of the install method of the present invention.

FIGS. 6, 7A, 7B and 8 are detailed flow diagrams illustrating a preferred embodiment of the present invention. It should be noted that the present invention may be implemented in a variety of ways and actual implementation may vary from the following description. FIG. 6 is a detailed flow diagram of the install method of the present invention used to install the present invention on a computer network. More specifically, a compact disk (CD) containing system files is used to boot (or start) a computer on the network (box 600). The present invention then discovers all storage devices (box 606) and a network administrator chooses and creates a common storage device and a custom storage device (box 612).

A volume group is then created on the custom storage device (box 618) and default logical volumes are created (box 624). Next, default file systems are created and mounted (box 630). Mounting the file systems means that the file system is made available to network computers. The common volume group is then activated (box 636) and the default file systems from the common volume group are mounted (box 642). Next, the default file systems from the common storage devices are populated (box 648). It should be noted that the common storage devices contain all the files necessary to initially populate the custom storage devices. The computer is then rebooted (box 654), completing the installation process (box 660).

Figure 7A:
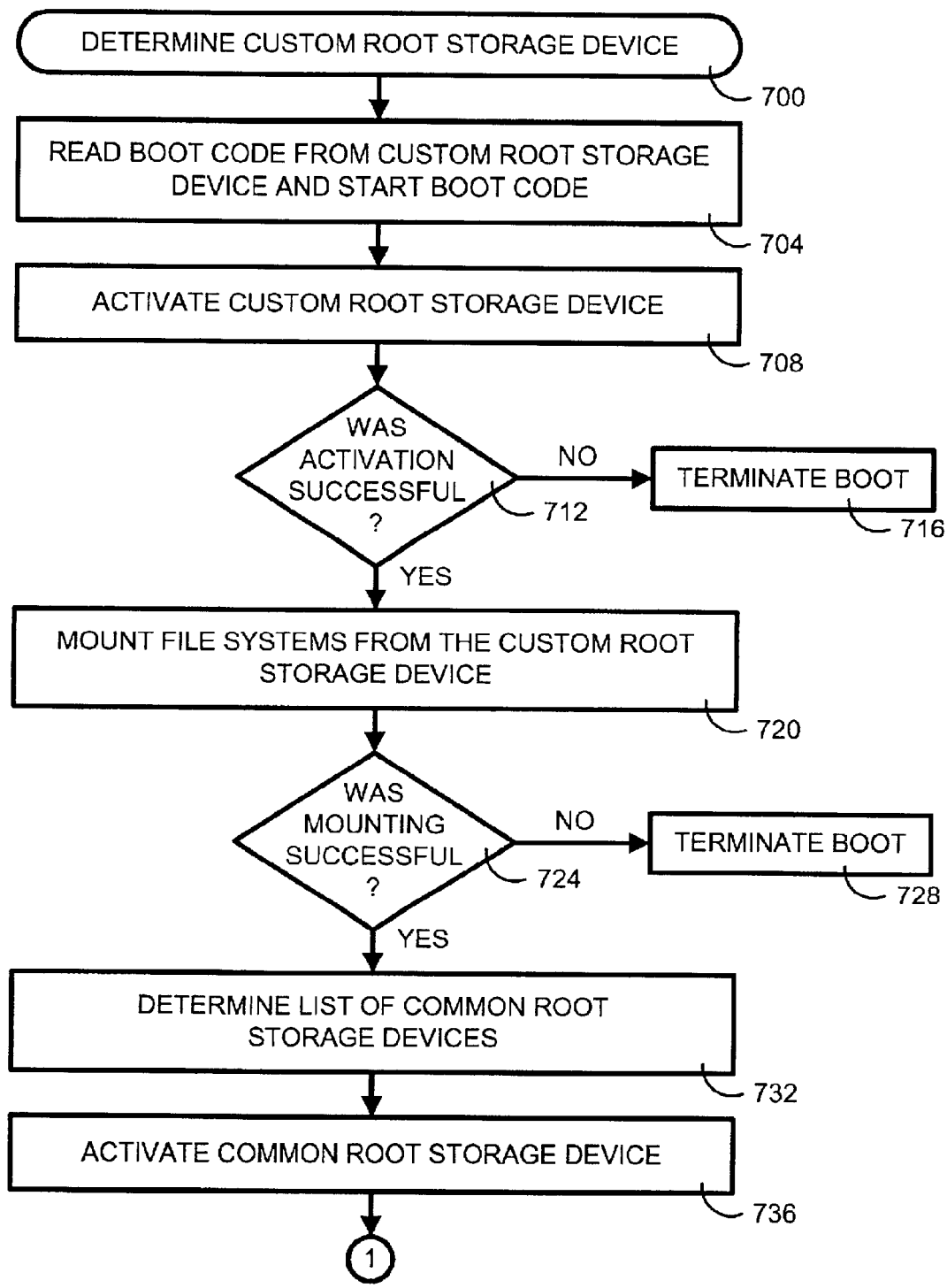
FIGS. 7A and B are detailed flow diagrams of the booting method of the present invention.
Figure 7B:
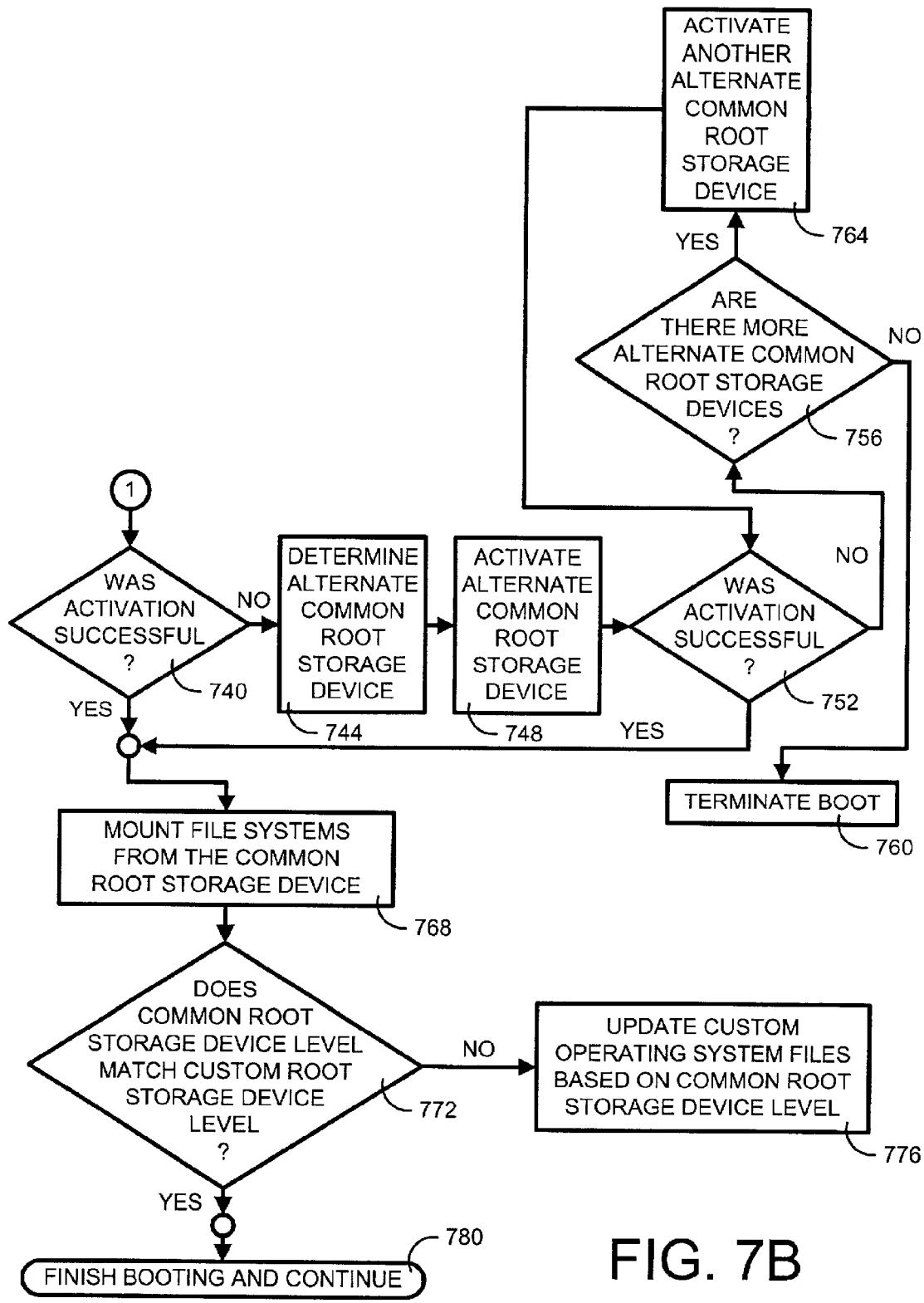

FIGS. 7A and 7B are detailed flow diagrams of the booting method of the present invention used after the computer has been rebooted. Initially, as shown in FIG. 7A, a custom root storage device is determined (box 700) and boot code from the custom root storage device is read and started (box 704). In other words, the boot code is found on the custom root storage device, loaded into memory and then activated. The custom root storage device is then activated (box 708). If the custom root storage device contains a volume group the volume group is activated along with other members of the custom root storage device. A determination is then made as to whether the activation was successful (box 712). If not, then the boot process is terminated (box 716). Otherwise, file systems from the custom root storage device are mounted (box 720). The present invention then determines whether the mounting was successful (box 724). If the mounting failed, the boot process is terminated (box 728). If the mounting was successful, a list of common root storage devices is determined (box 732). In a preferred embodiment, the custom boot storage device will contain information about the common root storage devices that are available.

Once the list of common root storage devices is determined, these devices are activated (box 736). If the primary common root storage device contains a volume group then the volume group is also activated along with other members of the common root storage device. As shown in FIG. 7B, a determination is then made as to whether the activation was successful (box 740). It should be noted that if the primary common root storage device is marked for updating the booting method can be forced to use an alternate common root storage device. If the activation of the primary common root storage device fails, then an alternate common root storage device is chosen (box 744) and then activated (box 748). The present invention then determines whether this activation was successful (box 752). If the activation of the alternate common root storage device fails, then a determination is made to whether there are more alternate common root storage devices (box 756). If not, then the booting process is terminated (box 760). Otherwise, another alternate common root storage device is activated (box 764).

Once the primary or an alternate root storage device has been activated, the booting method mounts the file systems from the activated common root storage device (box 768). The present invention then determines whether the level of the common root storage device (primary or alternate) matches the custom root storage device level (box 772). If the two levels do not match, the operating system files of the custom root storage device are updated based on the common root storage device level (box 776). Otherwise, the booting process is completed (box 780).

Figure 8:
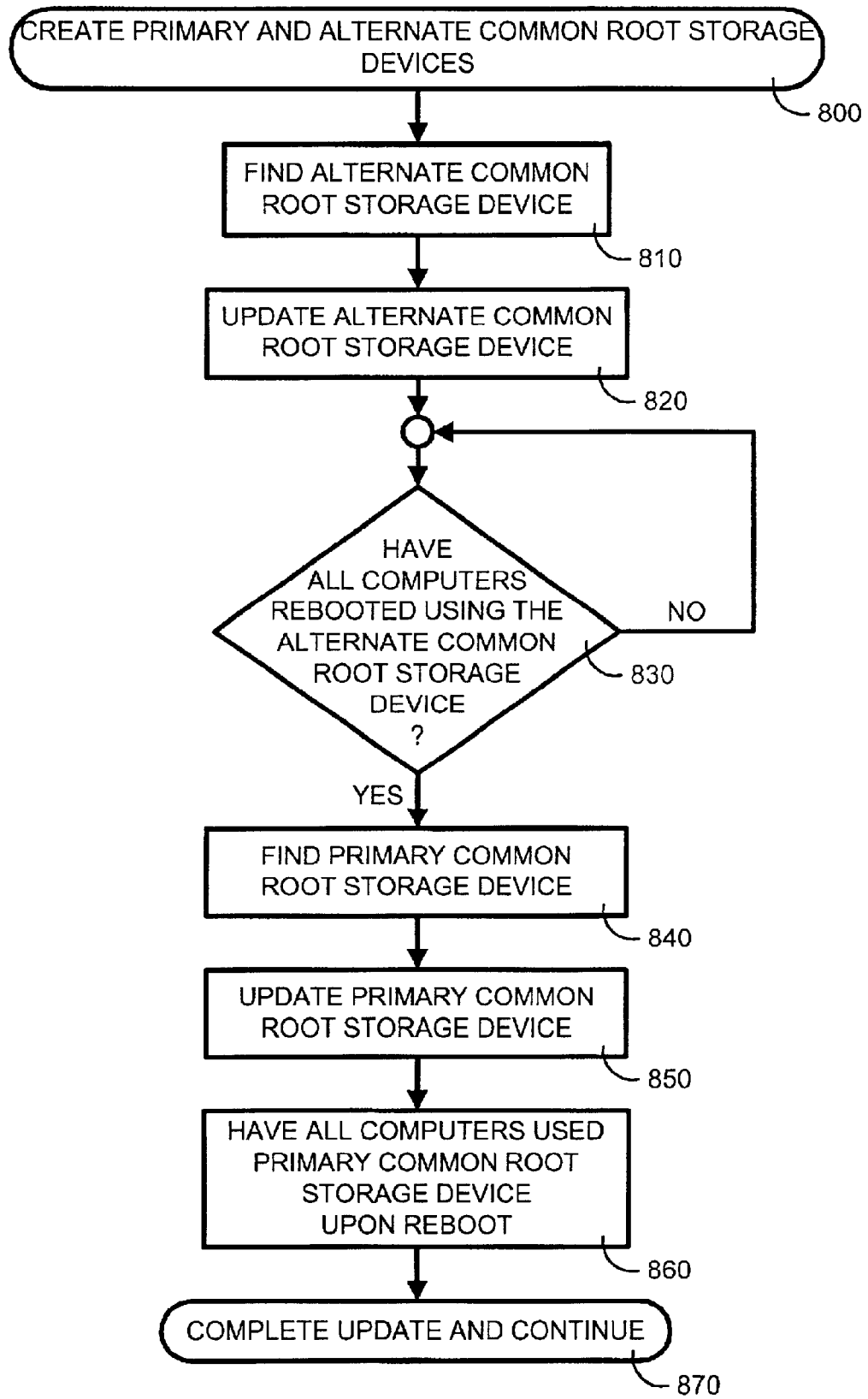
FIG. 8 is a detailed flow diagram of the update method in accordance with the present invention.

FIG. 8 is a detailed flow diagram of the update method in accordance with the present invention detailing the updating of the common root storage devices. In a preferred embodiment, a plurality of common root storage devices are created such that there are primary and alternated common root storage devices (box 800). During the update process, the present invention find alternate common root storage devices (box 810) and updates them (box 820). A determination is made to whether all computers have rebooted using the alternate common root storage devices (box 830). If not, then the present invention waits for all computers using the primary common root storage device to reboot using the alternate common root storage device. If all computers have rebooted using the alternate common root storage device, the primary common root storage device is found (box 840) and updated (box 850). After updating, the present invention has all computers reboot from the updated primary common root storage device (box 860). In this manner, the updating process is completed for both the primary and alternate common root storage devices (box 870).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for creating and managing storage devices in a computer network having a plurality of computers, comprising creating a common storage device having a primary common root storage device and an alternate common root storage device and a custom storage device, wherein the, common storage device stores files that are used by the plurality of computers and the custom storage device stores files specific to an individual one of the plurality of computers and further comprising updating the alternate common root storage device, causing each of the plurality of computers to use the undated alternate common root storage device upon reboot, determining that each of the plurality of computers are using the updated alternate common root storage device, updating the primary common root storage device and causing all of the plurality of computers to use the undated primary common root storage device upon reboot.

2. The method of claim 1, wherein the common storage device and the custom storage device are part of a storage area network.

3. A method for creating and managing a common storage device having a primary common root storage device and an alternate common root storage device and a custom storage device within a computer network, the computer network having a plurality of computers, the method comprising:

performing an install sequence to create the common storage device and the custom storage device on the computer network;

updating the common storage device using an update sequence when it is determined that the common storage device needs updating;

performing a boot sequence when it is determined that the one of the plurality of computers in the computer network has been rebooted;

updating the alternate common root storage device and causing each of the plurality of computers to use the updated alternate common root storage device upon reboot;

determining that each of the plurality of computers are using the updated alternate common root storage device; and updating the primary common root storage device and causing all of the plurality of computers to use the updated primary common root storage device upon reboot.

4. The method of claim 3, wherein performing the install sequence comprises allowing an administrator to choose and create the common storage device and the custom storage device.

5. The method of claim 3, wherein performing the install sequence comprises creating on the custom storage device a volume group having logical volumes.

6. The method of claim 5, wherein default file systems are created and mounted.

7. The method of claim 3, performing the install sequence comprises populating a file system from the common storage device.

8. The method of claim 7, wherein the common storage device contains files necessary to at least initially populate the custom storage device.

9. The method of claim 3, wherein performing a boot sequence comprises locating the boot code on the custom root storage device and then activating the custom root storage device.

10. The method of claim 3, wherein performing a boot sequence comprises activating at least one of the common root storage devices.

11. The method of claim 10, further comprising determining that activation of the primary common root storage device was not successful and activating the alternate common root storage device.

12. The method of claim 10, further comprising determining that the primary common root storage device is marked for updating and activating instead the alternate common root storage device.

13. The method of claim 10, further comprising determining whether a level of the activated common root storage device level matches a level of the custom root storage device and, if not, then updating the operating system files on the custom root storage device based on the common root storage device level.

14. A storage device management system for creating and managing common root storage devices having primary common root storage devices and alternate common root storage devices and custom root storage devices in a computer network containing a plurality of computers, the storage device management system comprising:

a storage area network in communication with the plurality of computers, the storage area network comprising:

common root storage devices containing files common to each of the plurality of computers, wherein each of the plurality of computers use updated information from the alternate common root storage devices upon reboot and wherein all of the plurality of computers use undated primary common root storage devices upon reboot when it is determined that each of the plurality of computers are using the updated alternate common root storage devices; and custom root storage devices for each of the plurality of computers, each of the plurality of computers having a corresponding custom root storage device that contains files specific to the corresponding one of the plurality of computers.

15. The storage device management system of claim 14, wherein the common root storage devices include a primary common root storage device and an alternate common root storage device.

\* \* \* \* \*